(12) United States Patent
Yonenaga et al.

(10) Patent No.: US 11,869,539 B2
(45) Date of Patent: Jan. 9, 2024

(54) INFORMATION PROCESSING DEVICE AND INFORMATION PROCESSING METHOD

(71) Applicant: SONY GROUP CORPORATION, Tokyo (JP)

(72) Inventors: Shinsuke Yonenaga, Tokyo (JP); Shimpei Tanemori, Tokyo (JP); Takashi Kuwabara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/921,511

(22) PCT Filed: Apr. 26, 2021

(86) PCT No.: PCT/JP2021/016624
§ 371 (c)(1),
(2) Date: Oct. 26, 2022

(87) PCT Pub. No.: WO2021/230061
PCT Pub. Date: Nov. 18, 2021

(65) Prior Publication Data
US 2023/0178108 A1      Jun. 8, 2023

(30) Foreign Application Priority Data

May 11, 2020    (JP) ................................ 2020-083414

(51) Int. Cl.
*G11B 20/10*       (2006.01)
*H04N 5/77*        (2006.01)
(Continued)

(52) U.S. Cl.
CPC ....... *G11B 20/10527* (2013.01); *H04N 5/772* (2013.01); *G11B 2020/10666* (2013.01)

(58) Field of Classification Search
None
See application file for complete search history.

(56) References Cited

U.S. PATENT DOCUMENTS

| 7,320,012 B2* | 1/2008 | Kageyama | G11C 29/70 |
| | | | 707/916 |
| 11,249,646 B1* | 2/2022 | Chu | G06F 3/0685 |

FOREIGN PATENT DOCUMENTS

| JP | 2000507017 | * | 6/2000 | ........... G06F 3/0689 |
| JP | 2008-262452 A | | 10/2008 | |

(Continued)

OTHER PUBLICATIONS

International Search Report and Written Opinion of PCT Application No. PCT/JP2021/016624, dated Jul. 6, 2021, 08 pages of ISRWO.

*Primary Examiner* — Hung Q Dang
(74) *Attorney, Agent, or Firm* — CHIP LAW GROUP

(57) ABSTRACT

An information processing device includes a plurality of buffers and a file recording processing unit. Different pieces of buffer data (BD) are accumulated in the plurality of buffers. The file recording processing unit secures two or more consecutive allocation units (AU) included in a recording medium as a ring buffer. The file recording processing unit extracts a plurality of pieces of buffer data (BD) each accumulated in one of the plurality of buffers at regular time intervals and records the plurality of pieces of buffer data (BD) in the ring buffer as a salvage file (SF) for data recovery.

7 Claims, 10 Drawing Sheets

(51) Int. Cl.
  *G06F 3/06*     (2006.01)
  *G06F 11/14*    (2006.01)

(56) References Cited

FOREIGN PATENT DOCUMENTS

| | | |
|---|---|---|
| JP | 2011-165012 A | 8/2011 |
| JP | 2012-182788 A | 9/2012 |
| JP | 2015-099521 A | 5/2015 |
| JP | 2019-057156 A | 4/2019 |

\* cited by examiner

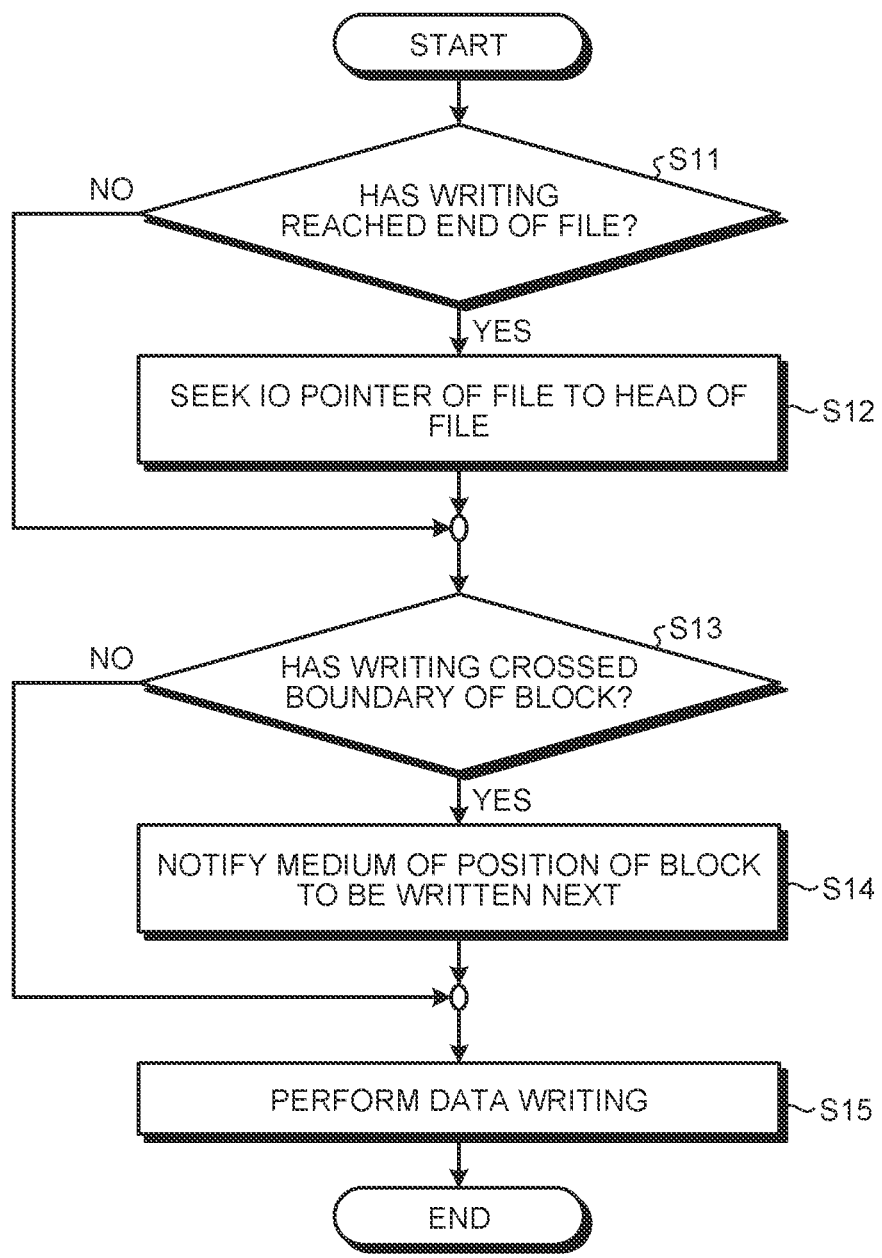

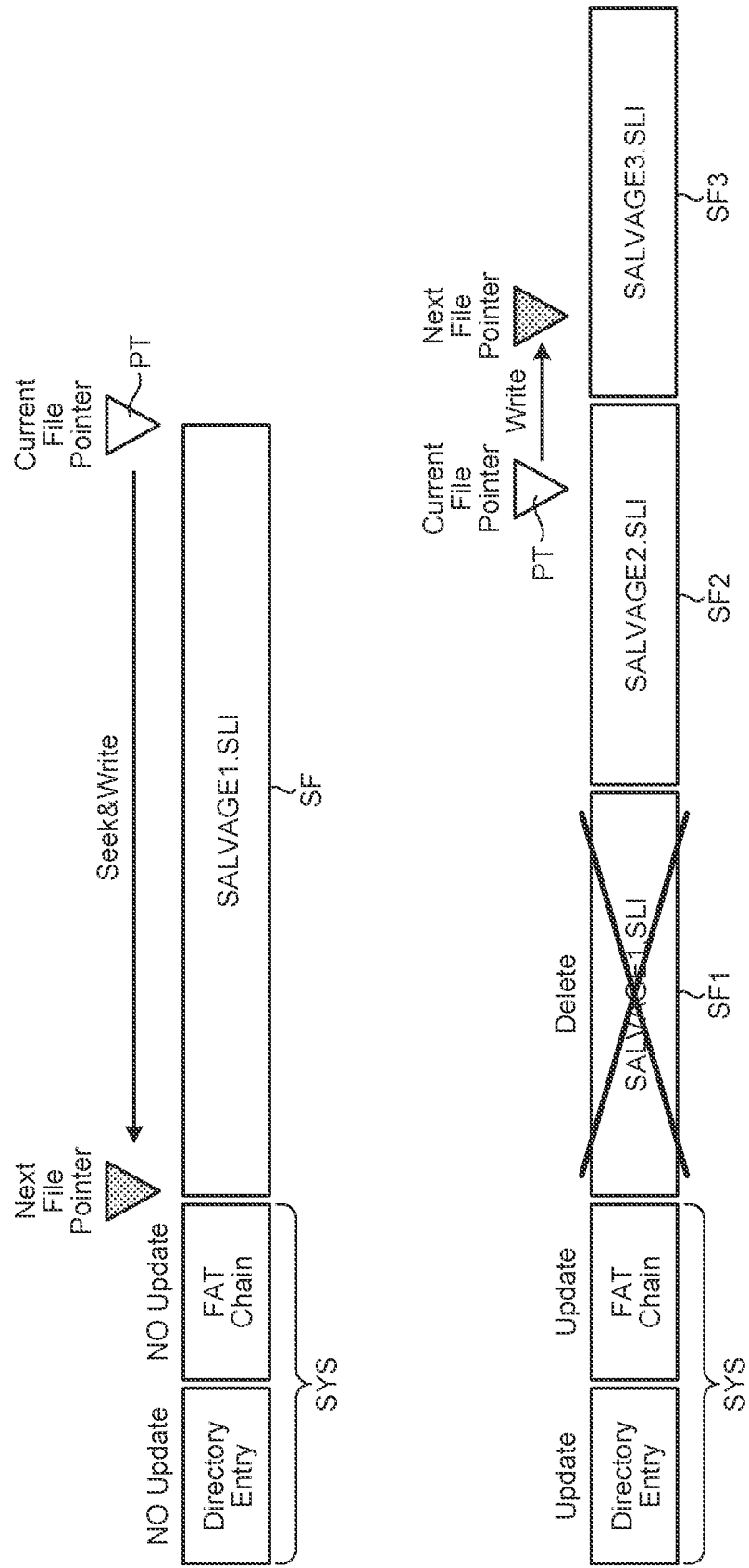

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/016624 filed on Apr. 26, 2021, which claims priority benefit of Japanese Patent Application No. JP 2020-083414 filed in the Japan Patent Office on May 11, 2020. Each of the above-referenced applications is hereby incorporated herein by reference in its entirety.

FIELD

The present invention relates to an information processing device, an information processing method, and a program.

BACKGROUND

Next-generation recording mediums aimed at higher speed and larger capacity are proposed. For example, semiconductor memories conforming to CFexpress attract attention since a large amount of photographic data can be transferred at a higher speed than XQD cards which have been the fastest until recently.

CITATION LIST

Patent Literature

Patent Literature 1: JP 2011-165012 A
Patent Literature 2: JP 2019-057156 A
Patent Literature 3: JP 2015-099521 A

SUMMARY

Technical Problem

In order to write a video on a recording medium at a high speed, it is necessary to perform writing for each predetermined unit of data amount. Therefore, input data is temporarily accumulated in a buffer, and a certain amount of data is accumulated and then recorded in the recording medium. When an abnormality occurs while data is being recorded, buffer data is lost without being recorded in the recording medium. Therefore, video is lost retroactively from the occurrence of the abnormality by the loss period corresponding to the buffer data.

It is conceivable to back up the buffer data at regular time intervals in order to shorten the loss period. However, increasing the frequency of backups causes the recording medium to be pressured by the backup data. Recently, the unit of writing data has also been increased accompanied with a demand for higher speed and larger capacity. Therefore, the above problem is likely to be apparent.

Therefore, the present disclosure proposes an information processing device, an information processing method, and a program capable of shortening a loss period without greatly pressuring a memory space.

Solution to Problem

According to the present disclosure, an information processing device is provided that comprises: a plurality of buffers in which different pieces of buffer data are accumulated; and a file recording processing unit that secures two or more consecutive allocation units comprised in a recording medium as a ring buffer, extracts a plurality of pieces of buffer data each accumulated in one of the plurality of buffers at regular time intervals, and records the plurality of pieces of buffer data in the ring buffer as a salvage file for data recovery. According to the present disclosure, an information processing method in which an information process of the information processing device is executed by a computer, and a program for causing the computer to execute the information process of the information processing device, are provided.

BRIEF DESCRIPTION OF DRAWINGS

FIG. 9 is a flowchart illustrating processing of writing to a salvage file.

FIG. 10 is a diagram explaining comparison with a comparative example.

DESCRIPTION OF EMBODIMENTS

Hereinafter, embodiments of the present disclosure will be described in detail on the basis of the drawings. In each of the following embodiments, the same parts are denoted by the same symbols, and redundant description will be omitted.

Note that the description will be given in the following order.

[1. System Configuration of Imaging Device]
[2. Data Recording Method]
[3. Specific Example of Data Recording Operation]
[4. Effects]

[1. System Configuration of Imaging Device]

Figure 1:
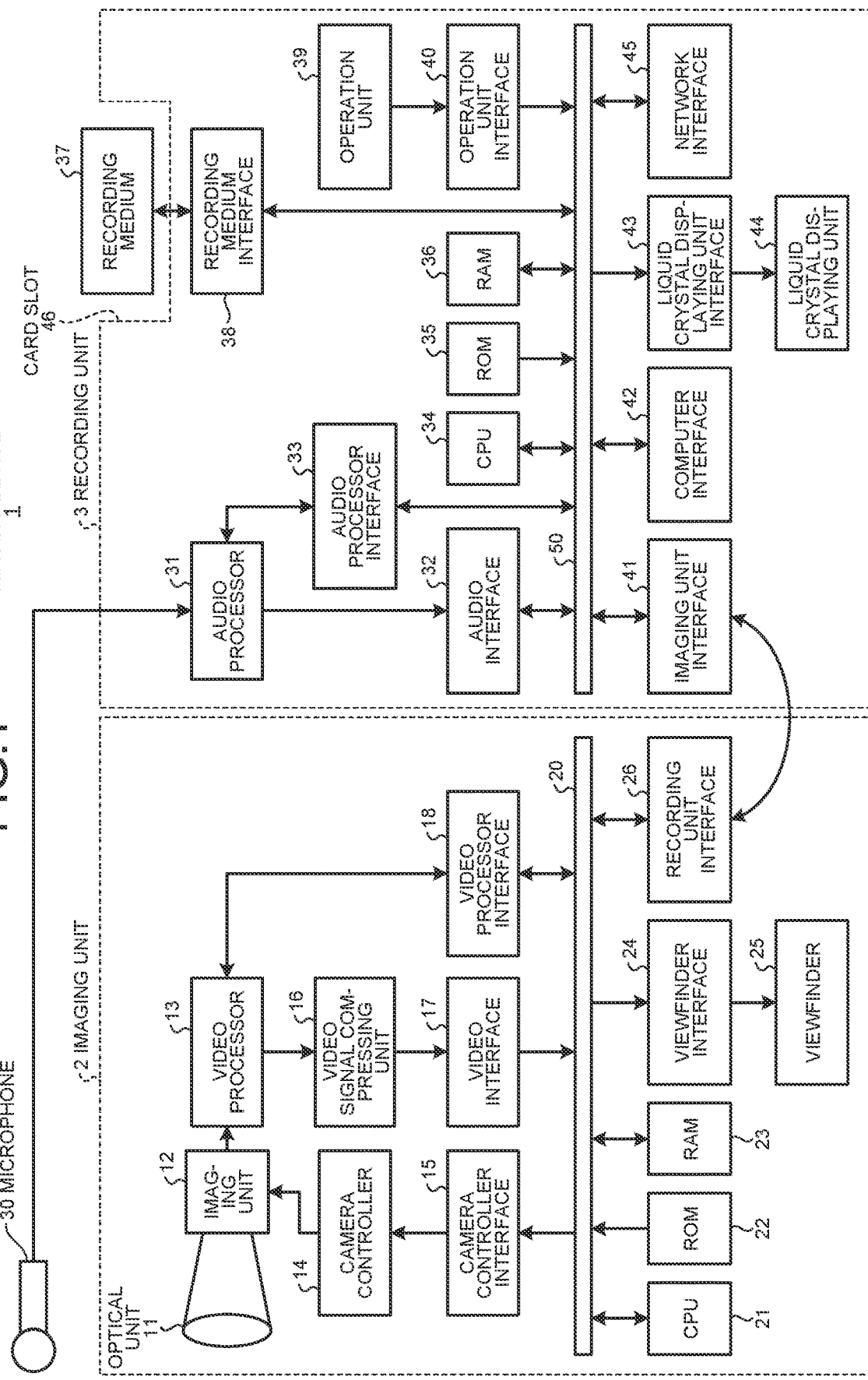
FIG. 1 is a diagram illustrating an example of a system configuration of an imaging device.

FIG. 1 is a diagram illustrating an example of a system configuration of an imaging device 1.

The imaging device 1 is an information processing device that processes input data such as video and audio. Processed data is recorded in a recording medium 37. As the recording medium 37, for example, a semiconductor memory conforming to CFexpress is used.

The imaging device 1 includes, for example, an imaging unit 2 and a recording unit 3. The imaging unit 2 controls, for example, a video camera and generates video data. The recording unit 3 records, for example, video data, audio data, and metadata in the recording medium 37 and reproduces the data.

The imaging unit 2 generates analog video signals by photoelectrically converting imaging light input via an optical unit 11. The optical unit 11 includes a lens, a diaphragm, a filter, and others. An imaging unit 12 includes a solid-state imaging element such as a charge coupled devices (CCD) imager. Imaging signals obtained by the imaging unit 12 are supplied to a video processor 13 having an analog-to-digital converter, an image adjustment function, and others.

The video processor 13 converts the supplied imaging signals into digital video data and performs image adjustment. The video processor 13 supplies the converted digital video signals to a video signal compressing unit 16 that compresses the digital video data by a predetermined method.

The video signal compressing unit 16 compresses and encodes the supplied digital video signal by a moving picture experts group (MPEG) method or the like. The video signal compressing unit 16 supplies the compressed video data to a data bus 20 via a video interface 17. The compressed video data is supplied to the recording unit 3 via a recording unit interface 26 and recorded in the recording medium 37. Each piece of data used in the imaging unit 2 is transmitted to each component via the data bus 20.

An operation signal output from an operation unit 39 is supplied from the recording unit 3 to a CPU 21 via an imaging unit interface 41, the recording unit interface 26, and the data bus 20. The central processing unit (CPU) 21 is a control means that controls processing of each component in the imaging unit 2 and interprets the operation signal supplied thereto. For interpreting the operation signal, the CPU 21 reads a control program from a ROM 22 at predetermined timing and temporarily stores temporary data, parameters, and others in a RAM 23. The read only memory (ROM) 22 is a memory, only reading from which is enabled, and the random access memory (RAM) 23 is a writable memory.

The CPU 21 converts the operation signal supplied from the operation unit 39 into a control signal for driving the imaging unit 12 and supplies the control signal to a camera controller 14 via a camera controller interface 15. The camera controller 14 controls a diaphragm, zooming, a filter, and the like of the imaging unit 12 on the basis of the control signal supplied thereto. The CPU 21 supplies an image processing signal instructing image processing to the video processor 13 via a video processor interface 18. The video processor 13 performs compression processing or the like of the digital video signal on the basis of the image processing signal supplied thereto.

The imaging unit 2 includes a viewfinder 25 that displays an image being captured, a reproduced image, metadata, or others. An image being captured, a reproduced image, metadata, or others transmitted via the data bus 20 are displayed on the viewfinder 25 having a liquid crystal screen or the like via a viewfinder interface 24.

The recording unit 3 has a microphone 30. The microphone 30 directed toward a subject collects ambient sound and generates analog audio data. The microphone 30 supplies an analog audio signal to an audio processor 31 having an analog-to-digital converter, an audio adjustment function, and others.

The audio processor 31 converts the supplied analog audio signal into digital audio data and performs audio adjustment. The audio processor 31 supplies the digital audio data to a data bus 50 via an audio interface 32. The digital audio data is stored in the recording medium 37. Various types of data used in the recording unit 3 is transmitted to each component via the data bus 50.

The operation unit 39 is used in recording, reproducing, and editing operations in the imaging unit 2 and the recording unit 3. The operation unit 39 includes, for example, a button, a switch, and the like. The operation unit 39 generates an operation signal by manual operation such as starting capturing an image. The generated operation signal is supplied from the operation unit 39 to a CPU 34 that controls processing in each component in the recording unit 3 via an operation unit interface 40 and the data bus 50.

At the time of recording, an operation signal is supplied to the imaging unit 2 via the imaging unit interface 41. The CPU 34 interprets the supplied operation signal, reads a control program from a ROM 35, which is read-only, at predetermined timing, and temporarily stores temporary data, parameters, and others in a RAM 36 which is writable.

The recording unit 3 has a card slot 46. In the recording unit 3, the recording medium (memory card) 37 is attached to the card slot 46 in a freely detachable manner. The recording medium 37 attached to the card slot 46 can perform data transfer with a data processing unit in the recording unit 3 via a recording medium interface 38.

In the recording unit 3, the imaging unit interface 41 is connected to the data bus 50 for exchange of data with the imaging unit 2. Video data captured by the imaging unit 2 is supplied to the recording medium 37 via the recording unit interface 26, the imaging unit interface 41, the data bus 50, and the recording medium interface 38 and recorded in the recording medium 37. At the time of recording, the CPU 34 functions as a recording control unit and executes control processing for recording.

The CPU 34 causes a liquid crystal displaying unit 44 having a liquid crystal screen to display a monitor video, a time code, an audio level, metadata, various menus, and others via the data bus 50 and a liquid crystal displaying unit interface 43, for example. Video data, the audio data, and the like read from the recording medium 37 can also be displayed as a video image reproduced by the liquid crystal displaying unit 44.

The imaging device 1 includes a computer interface 42 used for exchanging data with an external computer. The computer interface 42 is, for example, conforming to the USB standards and can transmit data by connecting an external computer device (not illustrated) thereto or play the sound of reproduced audio data by connecting a speaker thereto. The imaging device 1 includes a network interface 45 used for exchanging data via a network. The network interface 45 can transmit data by being connected to a server (not illustrated) or an external computer device.

[2. Data Recording Method]

Figure 2:
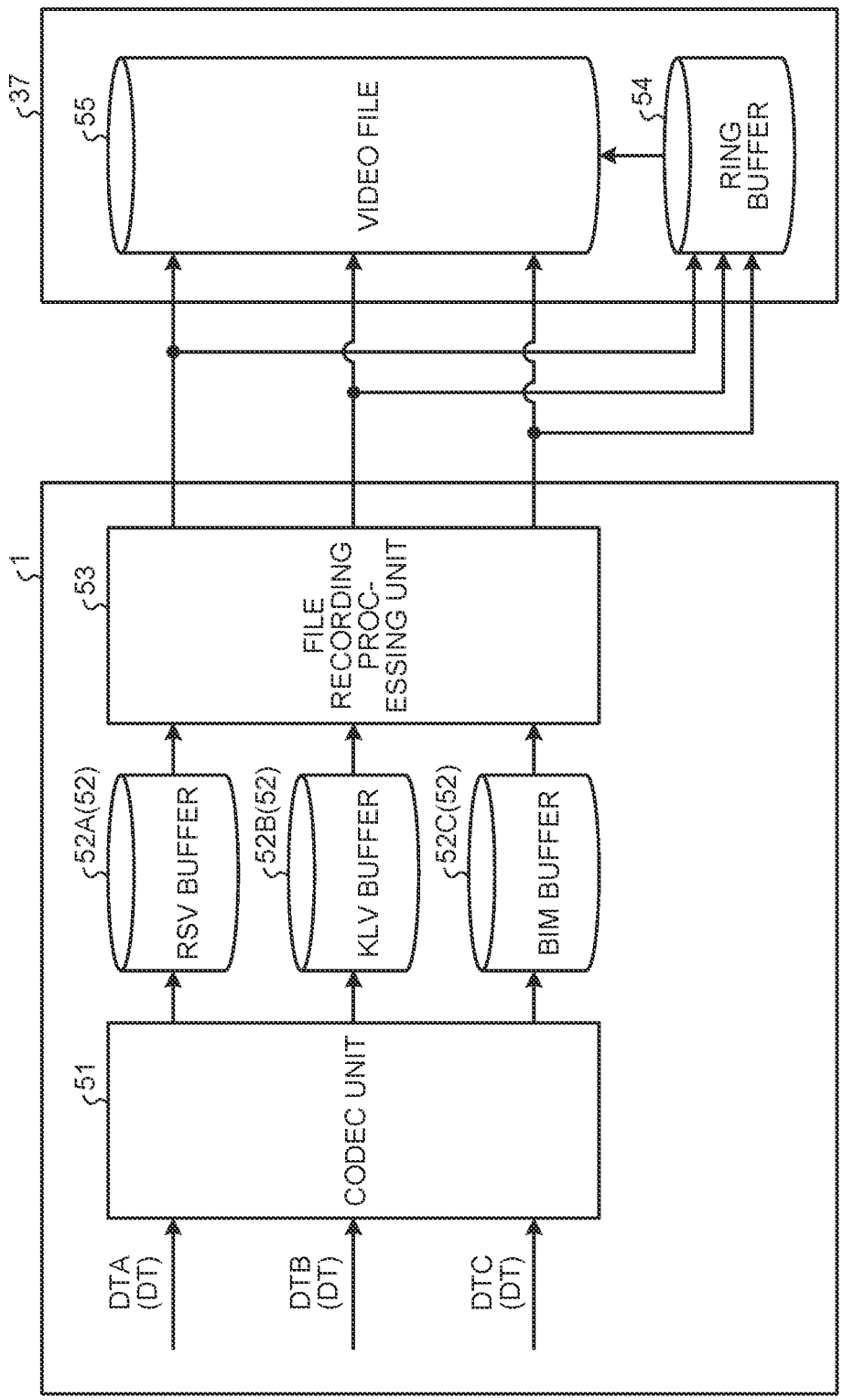
FIG. 2 is a diagram illustrating an example of a method of recording data in a recording medium.

FIG. 2 is a diagram illustrating an example of a method of recording data in the recording medium 37. FIG. 2 is a functional block diagram from the perspective of a flow of data to be recorded. Each piece of processing illustrated in FIG. 2 is performed using the video processor 13, the CPU 21, the CPU 34, the RAM 23, the RAM 36, or others illustrated in FIG. 1.

The imaging device 1 includes, for example, a codec unit 51, a file recording processing unit 53, and a plurality of buffers 52.

A plurality of pieces of data DT is input to the codec unit 51. In the example of FIG. 2, for example, RSV (RSView32 Project) data DTA, KLV (Key-Length-Value) data DTB, and Binary format for Metadata (BIM) data DTC are input as the plurality of pieces of data DT. The codec unit 51 encodes each of the pieces of data DT and outputs the encoded data DT to the buffers 52.

The imaging device 1 includes the plurality of buffers 52 corresponding to the respective pieces of data DT. Different pieces of buffer data BD (see FIG. 4) are accumulated in the plurality of buffers 52. In the present embodiment, as the plurality of buffers 52, an RSV buffer 52A corresponding to the RSV data DTA, a KLV buffer 52B corresponding to the KLV data DTB, and a BIM buffer 52C corresponding to the BIM data DTC are included. In each of the buffers 52, data coded by the codec unit 51 is accumulated as buffer data BD.

Figure 3:
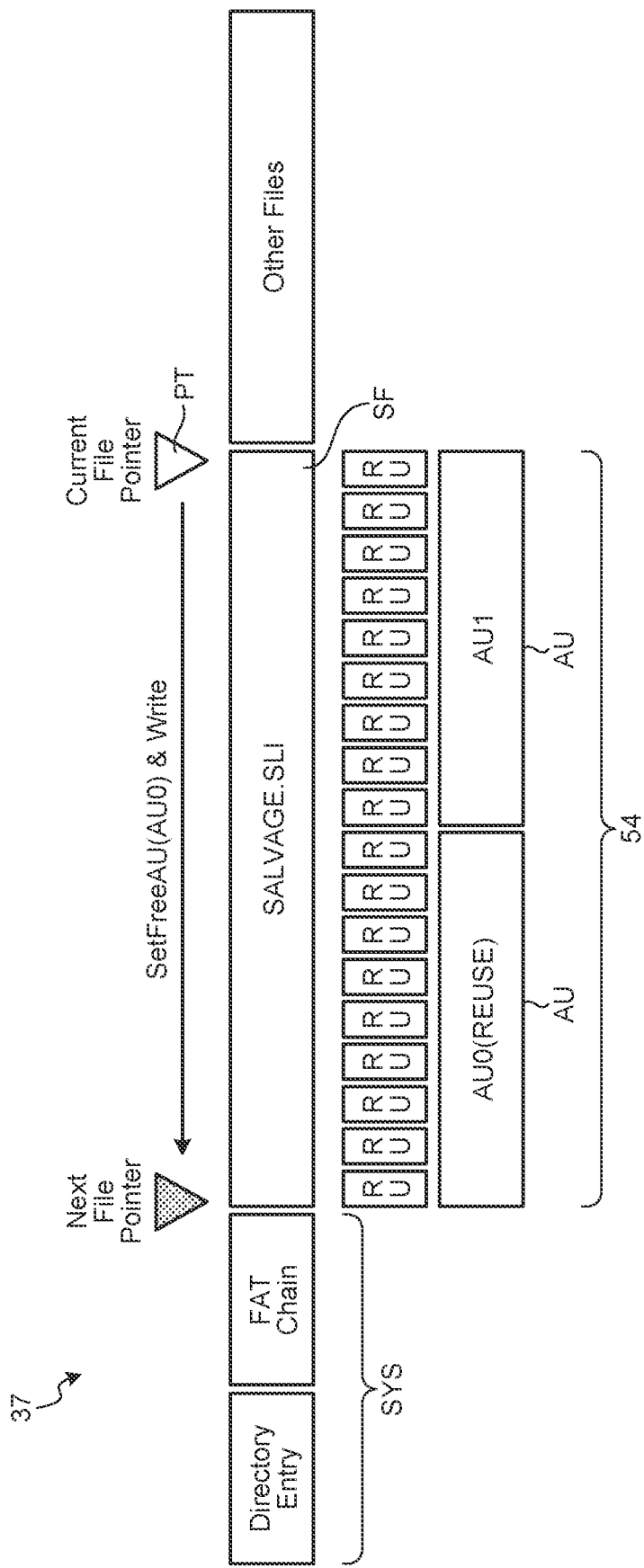
FIG. 3 is a diagram illustrating a configuration of a ring buffer.

Each of the buffers 52 has a buffer capacity that is an integral multiple of a recording unit RU (see FIG. 3). A recording unit BU is a minimum unit in which data is written by one multi-block write command. The capacity of the recording unit RU is defined by a standard. The capacity of a recording unit RU defined in CFexpress is 2 MB. In this embodiment, the buffer capacity of each of the buffers 52 is equal to the capacity of one recording unit RU. Therefore, the memory space of the recording medium 37 is suppressed from being pressured by the buffer data BD. The buffer data BD which has reached the buffer capacity is output to the recording medium 37 by the file recording processing unit 53 and is stored in a video recording space 55 of the recording medium 37 as a video file VF.

The file recording processing unit 53 backs up the buffer data BD at regular time intervals so that no long loss period occurs due to an abnormality occurring during recording. For example, in a case where an allowable loss period is ten seconds, the file recording processing unit 53 extracts the buffer data BD from the respective buffers 52 every ten seconds. The file recording processing unit 53 secures, in the recording medium 37, a memory space that functions as a ring buffer 54 and records the buffer data BD of the respective buffers 52 extracted every ten seconds in the memory space.

FIG. 3 is a diagram illustrating a configuration of the ring buffer 54.

The file recording processing unit 53 secures two or more consecutive allocation units AU included in the recording medium 37 as the ring buffer 54. An allocation unit AU is a management unit on a logical space of a memory device for securing the performance of high-speed writing. One allocation unit AU includes a plurality of recording units RU. The file recording processing unit 53 extracts a plurality of pieces of buffer data each accumulated in one of the plurality of buffers 52 at regular time intervals and records the plurality of pieces of buffer data in the ring buffer 54. The buffer data recorded in the ring buffer 54 is stored, for example, as a salvage file SF for data recovery named "SALVAGE.SLI".

The file recording processing unit 53 positions the head of the salvage file SF at a boundary of the allocation units AU. When a file pointer PT reaches an end of the file (a boundary of the allocation units AU), the file recording processing unit 53 secures the allocation unit AU at the head of the salvage file SF again. The file recording processing unit 53 starts writing data again from the head of the allocation unit AU that has been secured again. Files other than the salvage file SF, such as video files VF and system files SYS, are stored in a memory space different from the ring buffer 54. Information of a file system such as a file allocation table (FAT) or a directory entry is recorded in a system file SYS.

As described above, when the writing is completed up to the end of the plurality of consecutive allocation units AU, the allocation unit AU in the head is secured again. At this point, the buffer data written in the allocation unit AU in the head is erased. Therefore, in order to keep holding the latest buffer data at all times, it is only required that the ring buffer 54 include at least two allocation units AU. The salvage file SF recorded in the ring buffer 54 is not referred to except when an abnormality occurs. Therefore, it is preferable to minimize the memory space of the ring buffer 54. Therefore, in the present embodiment, the ring buffer 54 consists of the two consecutive allocation units AU.

Hereinafter, a method of generating and recording a salvage file SF will be described with reference to FIGS. 4 to 7.

Figure 4:
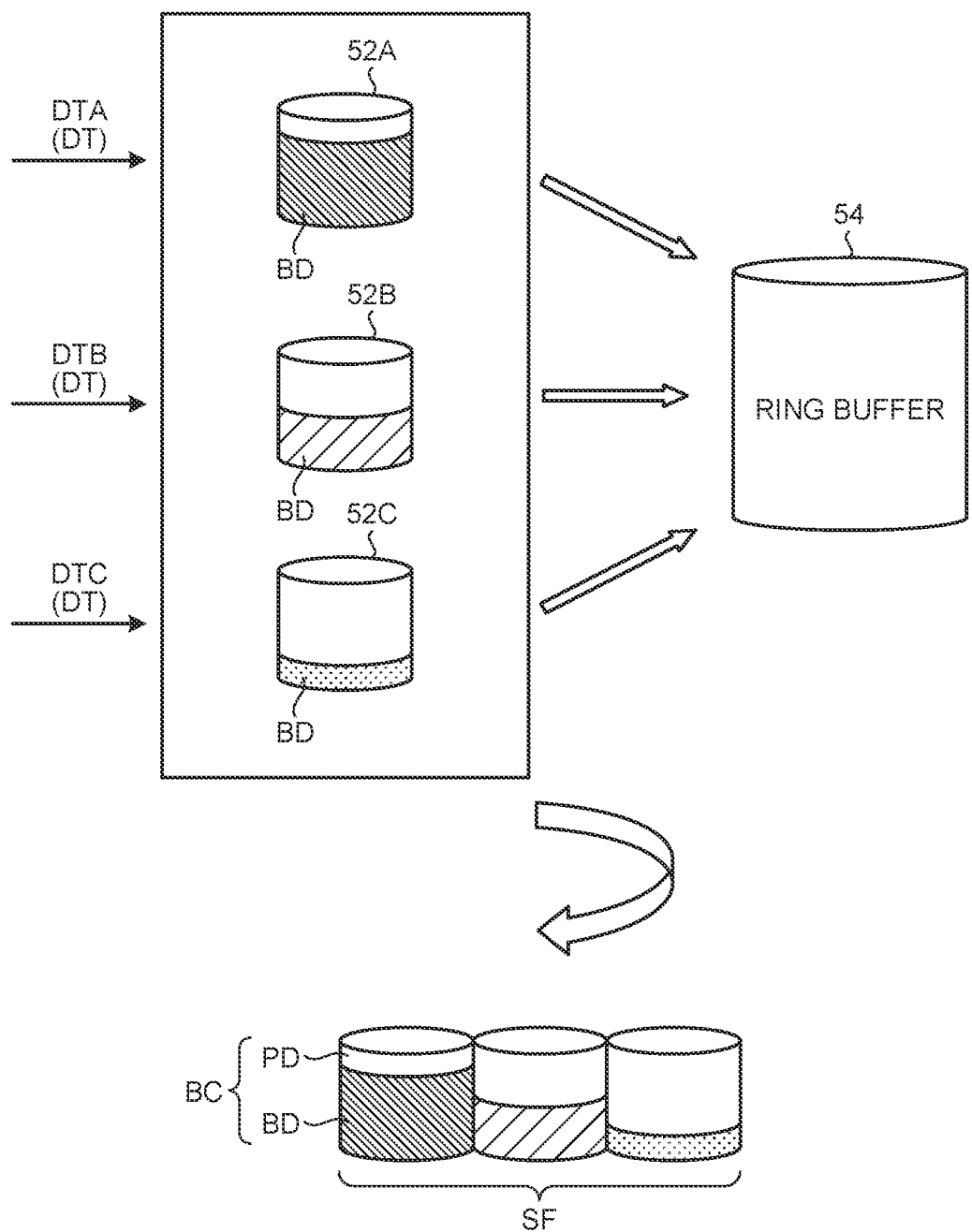
FIG. 4 is a diagram explaining a method of generating and storing a salvage file.

As illustrated in FIG. 4, the file recording processing unit 53 backs up the buffer data BD at regular time intervals so that no long loss period occurs due to an abnormality occurring during recording. For example, in a case where an allowable loss period is ten seconds, the file recording processing unit 53 extracts the buffer data BD from the respective buffers 52 every ten seconds. The file recording processing unit 53 secures, in the recording medium 37, a memory space that functions as a ring buffer 54 and records the buffer data BD of the respective buffers 52 extracted every ten seconds in the memory space.

For example, the file recording processing unit 53 pads each of the buffer data BD for a portion not reaching the buffer capacity. The file recording processing unit 53 combines the plurality of pieces of padded buffer data BD and records the combined buffer data BD in the ring buffer 54 as a salvage file SF for data recovery.

As a padding method, for example, zero padding is used. By the padding, embedded data PD is added to a portion not reaching the buffer capacity. Correction data BC having the same capacity as the buffer capacity is generated by the buffer data BD and the embedded data PD. The file recording processing unit 53 generate the salvage file SF by combining a plurality of pieces of correction data BC obtained by padding.

Figure 5:
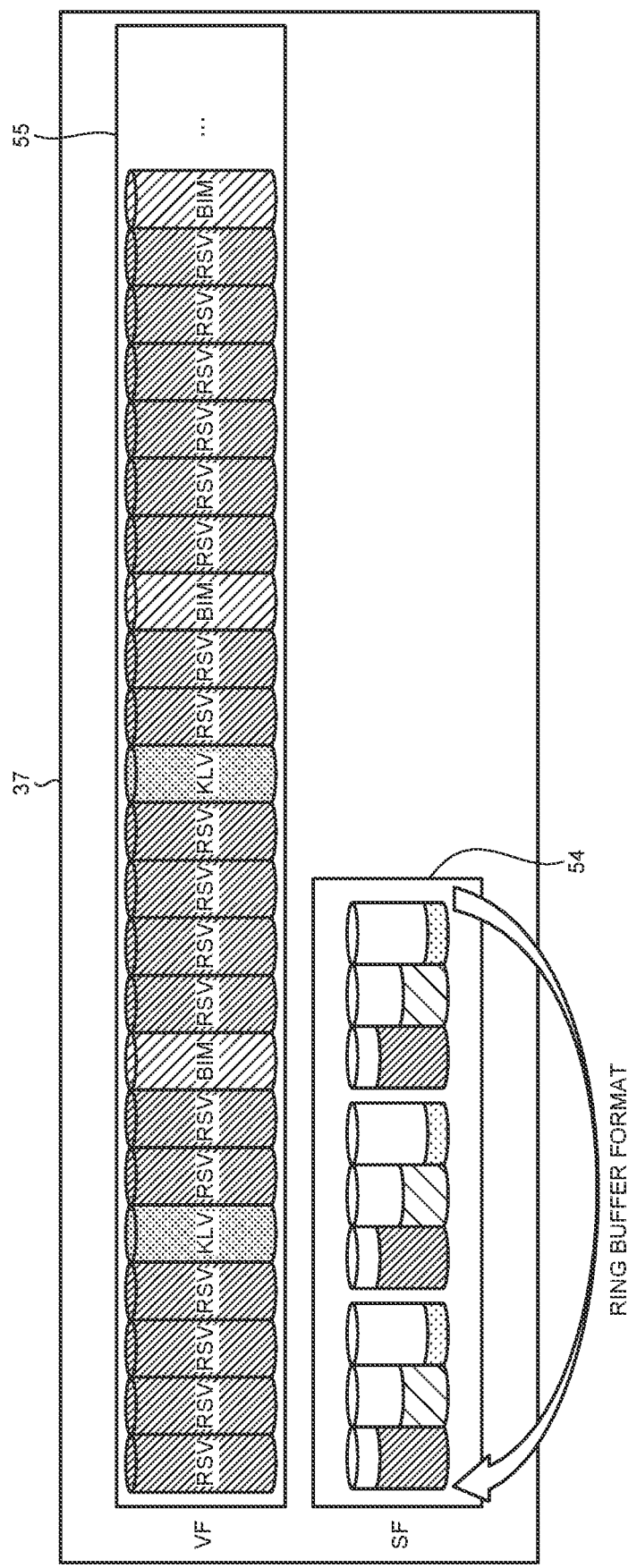
FIG. 5 is a diagram explaining a method of generating and storing a salvage file.

As illustrated in FIG. 5, the file recording processing unit 53 acquires buffer data BD reaching the buffer capacity from each of the buffers 52 and records the buffer data BD as a video file VF in a memory space of the recording medium 37 different from the ring buffer 54.

Figure 6:
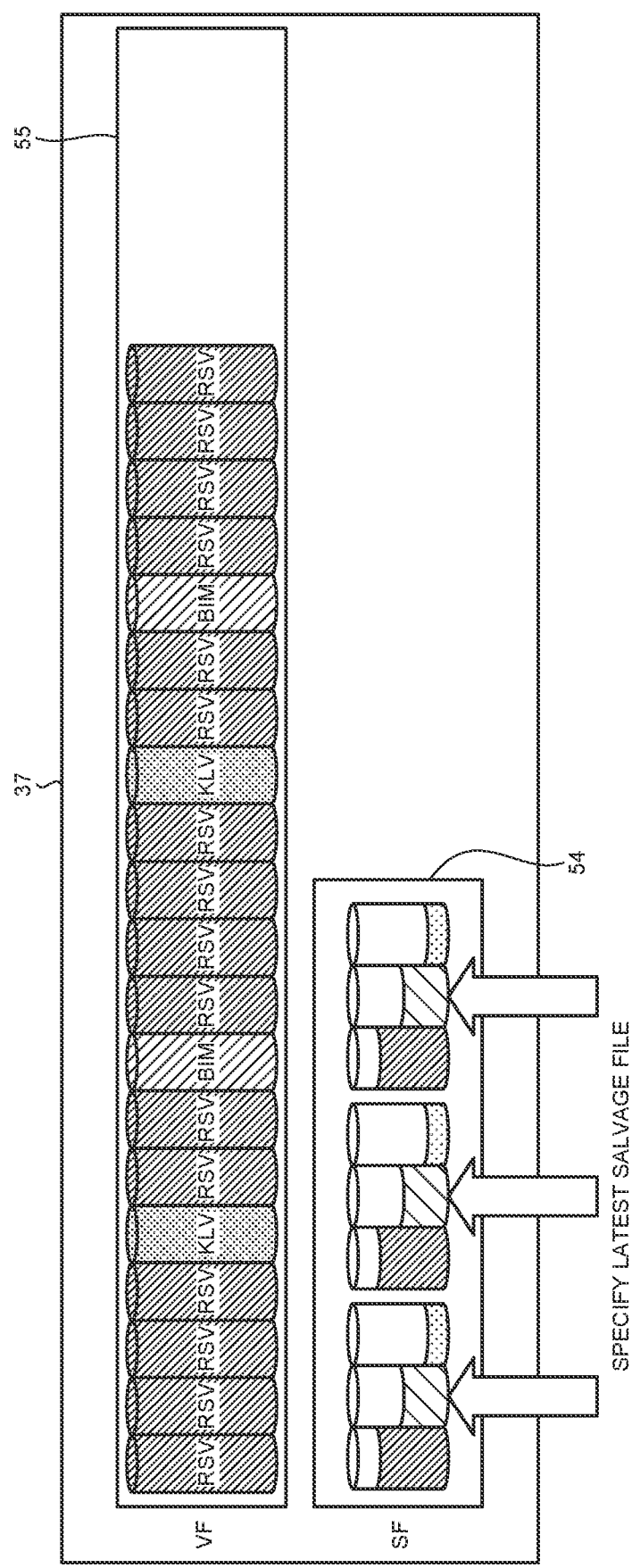
FIG. 6 is a diagram explaining a method of generating and storing a salvage file.
Figure 7:
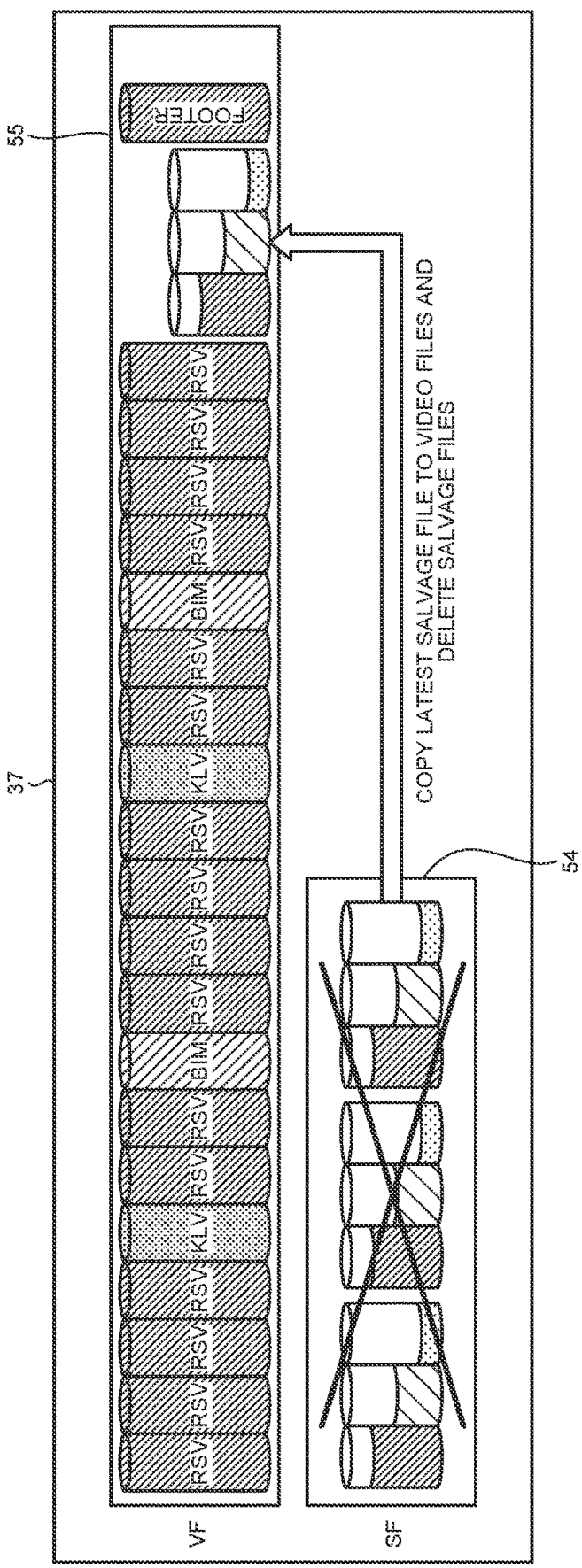
FIG. 7 is a diagram explaining a method of generating and storing a salvage file.

As illustrated in FIG. 6, in response to occurrence of an error in the recording medium 37, the file recording processing unit 53 specifies the latest salvage file SF from among a plurality of salvage files SF recorded in the ring buffer 54. The file recording processing unit 53 adds the latest salvage file SF to the tail end of the video files VF. Thereafter, as illustrated in FIG. 7, the file recording processing unit 53 deletes all the salvage files SF recorded in the ring buffer 54.

[3. Specific Example of Data Recording Operation]

Figure 8:
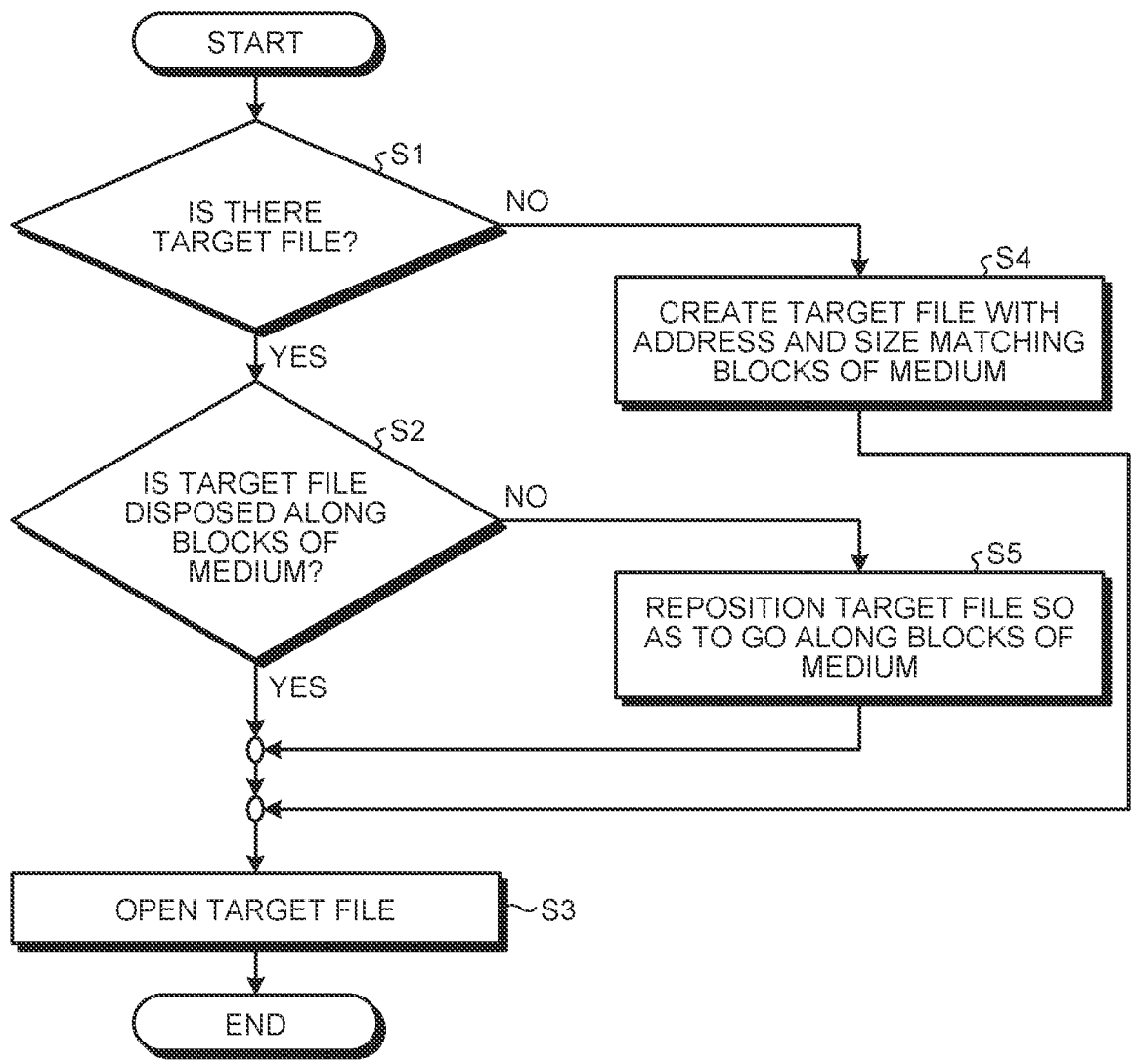
FIG. 8 is a flowchart illustrating processing of opening a salvage file.

Hereinafter, an example of an information processing method of the imaging device 1 related to generation of a salvage file SF will be explained. FIG. 8 is a flowchart illustrating processing of opening a salvage file SF.

In Step S1, the file recording processing unit 53 determines whether or not there is a salvage file SF to be written in the recording medium 37.

If it is determined in Step S1 that there is a salvage file SF (Step S1: Yes), the processing proceeds to Step S2.

In Step S2, the file recording processing unit 53 determines whether or not the salvage file SF is disposed along the blocks of the recording medium 37 (blocks of a memory partitioned as allocation units AU).

For example, the file recording processing unit 53 detects the position of the head of the salvage file SF when the salvage file SF is opened. In a case where the head of the salvage file SF is at a boundary of the allocation units AU, the file recording processing unit 53 determines that the salvage file SF is disposed along the blocks.

If it is determined in Step S2 that the salvage file SF is disposed along the blocks of the recording medium 37 (Step S2: Yes), the processing proceeds to Step S3. In Step S3, the file recording processing unit 53 opens the salvage file SF.

In a case where it is determined in Step S1 that there is no salvage files SF (Step S1: No), the processing proceeds to Step S4. In Step S4, the file recording processing unit 53 creates a salvage file SF with an address and a size matching the blocks of the recording medium 37. Then, the processing proceeds to Step S3, and the salvage file SF is opened by the file recording processing unit 53.

If it is determined in Step S2 that the salvage file SF is not disposed along the blocks of the recording medium 37 (Step S2: No), the processing proceeds to Step S5. In Step S5, the file recording processing unit 53 changes the position of the salvage file SF so that the position of the head of the salvage file SF is disposed at a boundary of the allocation units AU. Then, the processing proceeds to Step S3, and the salvage file SF is opened by the file recording processing unit 53.

FIG. 9 is a flowchart illustrating processing of writing to a salvage file SF.

In Step S11, the file recording processing unit 53 determines whether or not writing has reached the end of a salvage file SF.

If it is determined in Step S11 that the writing has reached the end of the salvage file SF (Step S11: Yes), the processing proceeds to Step S12. In Step S12, the file recording processing unit 53 seeks the file pointer PT to the head of the salvage file SF. Then, the processing proceeds to Step S13.

In Step S13, the file recording processing unit 53 determines whether or not the writing has crossed a boundary of a block.

In Step S13, if it is determined that the writing has crossed a boundary of a block (Step S13: Yes), the processing proceeds to Step S14. In Step S14, the file recording processing unit 53 notifies the recording medium 37 of the position of a block to be written next. Then, the processing proceeds to Step S15. In Step S15, the file recording processing unit 53 performs writing at the position notified to the recording medium 37.

In Step S11, if it is not determined that the writing has reached the end of the salvage file SF (Step S11: No), the processing proceeds to Step S13. Then, the flow from Step S13 described above is performed. In Step S13, if it is not determined that the writing has crossed a boundary of a block (Step S13: No), the processing proceeds to Step S15. Then, in Step S15, writing of data is continued.

Note that Step S14 and Step S15 may be executed by the same command.

[4. Effects]

The imaging device 1 includes the plurality of buffers 52 and the file recording processing unit 53. Different pieces of buffer data BD are accumulated in the plurality of buffers 52. The file recording processing unit 53 secures two or more consecutive allocation units AU included in the recording medium 37 as the ring buffer 54. The file recording processing unit 53 extracts a plurality of pieces of buffer data BD each accumulated in one of the plurality of buffers 52 at regular time intervals and records the plurality of pieces of buffer data BD in the ring buffer 54 as a salvage file SF for data recovery. In the information processing method of the present embodiment, the information processing of the information processing device described above is executed by a computer. A program of the present embodiment causes a computer to implement the information processing of the information processing device described above.

With this configuration, the buffer data BD is recorded in a ring buffer format. Therefore, the loss period can be shortened without greatly pressuring the memory space of the recording medium 37.

In addition, since the memory space of the salvage file SF is fixed, it is not necessary to update the position information of the salvage file SF (file management information of the system file SYS). For example, the upper part of FIG. 10 is a diagram illustrating a method of generating a salvage file SF of the present embodiment, and the lower part of FIG. 10 is a diagram illustrating a method of generating salvage files SF as a comparative example. In the comparative example, new salvage files SF (SF1, SF2, SF3, . . . ) are sequentially recorded along blocks of the recording medium 37, and old salvage files SF are sequentially deleted. The salvage files SF are not recorded in the ring buffer format. In this method, since the memory space of a salvage file SF changes, it is necessary to update the position information of the salvage file SF. In the present embodiment, it is not necessary to update the position information of a salvage file SF, and thus the processing of the file recording processing unit 53 is reduced.

The file recording processing unit 53 pads each of the buffer data BD for a portion not reaching the buffer capacity. The file recording processing unit 53 generates a salvage file SF by combining the plurality of pieces of padded buffer data BD.

With this configuration, even in a case where buffer data BD does not reach the buffer capacity, the buffer data BD can be reliably recorded in the recording medium 37.

The file recording processing unit 53 acquires buffer data BD reaching the buffer capacity from each of the buffers 52 and records the buffer data BD as a video file VF in a memory space of the recording medium 37 different from the ring buffer 54. In response to the occurrence of an error in the recording medium 37, the file recording processing unit 53 adds the latest salvage file SF to the tail end of the video files VF. Then, the file recording processing unit 53 deletes all the salvage files SF recorded in the ring buffer 54.

With this configuration, the video can be reliably restored on the basis of the latest buffer data BD.

The file recording processing unit 53 detects the position of the head of the salvage file SF when the salvage file SF is opened. In a case where the position of the head is not at a boundary of the allocation units AU, the file recording processing unit 53 changes the position of a salvage file SF so that the position of the head of the salvage file SF is disposed at a boundary of the allocation units AU.

According to this configuration, it is possible to support the recording medium 37 in which data can be written only from the head of allocation units AU, like in CFexpress.

The ring buffer 54 includes two consecutive allocation units AU.

With this configuration, the memory space of the recording medium 37 is suppressed from being pressured.

Note that the effects described herein are merely examples and are not limited, and other effects may also be achieved.

Note that the present technology can also have the following configurations.

(1)

An information processing device comprising:
a plurality of buffers in which different pieces of buffer data are accumulated; and
a file recording processing unit that secures two or more consecutive allocation units comprised in a recording medium as a ring buffer, extracts a plurality of pieces of buffer data each accumulated in one of the plurality of buffers at regular time intervals, and records the plurality of pieces of buffer data in the ring buffer as a salvage file for data recovery.

(2)

The information processing device according to (1), wherein the file recording processing unit generates the salvage file by padding each of the plurality of pieces of buffer data for a portion not reaching a buffer capacity and combining the plurality of pieces of padded buffer data.

(3)

The information processing device according to (2), wherein the file recording processing unit acquires buffer data having reached the buffer capacity from each of the buffers and records the buffer data as a video file in a memory space of the recording medium, the memory space being different from the ring buffer, and the file recording processing unit adds a latest salvage file to a tail end of the video file and deletes all of the salvage files recorded in the ring buffer in response to occurrence of an error in the recording medium.

(4)

The information processing device according to any one of (1) to (3), wherein the file recording processing unit detects a position of a head of the salvage file when the salvage file is opened and, in a case where the position of the head is not at a boundary of the allocation units, changes a position of the salvage file so that the position of the head of the salvage file is disposed at the boundary of the allocation units.

(5)

The information processing device according to any one of (1) to (4), wherein the ring buffer comprises the two consecutive allocation units.

(6)

An information processing method executed by a computer, the method comprising the steps of:

accumulating different pieces of buffer data in a plurality of buffers;

securing two or more consecutive allocation units comprised in a recording medium as a ring buffer; and extracting a plurality of pieces of buffer data each accumulated in one of the plurality of buffers at regular time intervals and recording the plurality of pieces of buffer data in the ring buffer as a salvage file for data recovery.

(7)

A program for causing a computer to implement:

accumulating different pieces of buffer data in a plurality of buffers;

securing two or more consecutive allocation units comprised in a recording medium as a ring buffer; and extracting a plurality of pieces of buffer data each accumulated in one of the plurality of buffers at regular time intervals and recording the plurality of pieces of buffer data in the ring buffer as a salvage file for data recovery.

REFERENCE SIGNS LIST

1 IMAGING DEVICE (INFORMATION PROCESSING DEVICE)
52 BUFFER
53 FILE RECORDING PROCESSING UNIT
54 RING BUFFER
AU ALLOCATION UNIT
BD BUFFER DATA
RU RECORDING UNIT
SF SALVAGE FILE
VF VIDEO FILE

The invention claimed is:

1. An information processing device, comprising:
a plurality of buffers configured to accumulate different pieces of buffer data; and
a central processing unit (CPU) configured to:
secure at least two consecutive allocation units in a recording medium as a ring buffer;
extract a plurality of pieces of the buffer data at regular time intervals, wherein each buffer data of the plurality of pieces of the buffer data is accumulated in one buffer of the plurality of buffers; and
record the plurality of pieces of the buffer data in the ring buffer as a salvage file for data recovery.

2. The information processing device according to claim 1, wherein the CPU is further configured to:
execute a padding process to pad each buffer data of the plurality of pieces of the buffer data for a portion that does not reach a buffer capacity; and
combine the plurality of pieces of the buffer data that is padded to generate the salvage file.

3. The information processing device according to claim 2, wherein the CPU is further configured to:
acquire the buffer data that has reached the buffer capacity from each buffer of the plurality of buffers;
record the buffer data as a video file in a memory space of the recording medium, wherein the memory space is different from the ring buffer;
add a latest salvage file to a tail end of the video file based on occurrence of an error in the recording medium; and
delete salvage files, including the salvage file, recorded in the ring buffer.

4. The information processing device according to claim 1, wherein the CPU is further configured to:
detect a position of a head of the salvage file in a case where the salvage file is opened; and
in a case where the position of the head is not at a boundary of the at least two consecutive allocation units, change a position of the salvage file so that the position of the head of the salvage file is at the boundary of the at least two consecutive allocation units.

5. The information processing device according to claim 1, wherein the ring buffer comprises the at least two consecutive allocation units.

6. An information processing method, comprising:
accumulating different pieces of buffer data in a plurality of buffers;
securing at least two consecutive allocation units in a recording medium as a ring buffer;
extracting a plurality of pieces of the buffer data at regular time intervals, wherein each buffer data of the plurality of pieces of the buffer data is accumulated in one buffer of the plurality of buffers; and
recording the plurality of pieces of the buffer data in the ring buffer as a salvage file for data recovery.

7. A non-transitory computer-readable medium having stored thereon computer-executable instructions, that when executed by a processor, cause the processor to execute operations, the operations:
accumulating different pieces of buffer data in a plurality of buffers;

securing at least two consecutive allocation units in a recording medium as a ring buffer;

extracting a plurality of pieces of the buffer data at regular time intervals, wherein each buffer data of the plurality of pieces of the buffer data is accumulated in one buffer of the plurality of buffers; and recording the plurality of pieces of the buffer data in the ring buffer as a salvage file for data recovery.

\* \* \* \* \*